July 24, 1951 H. M. BASCOM ET AL 2,561,722

SIGNALING SYSTEM

Original Filed Aug. 17, 1944

2 Sheets-Sheet 1

FIG. 1 TRANSMITTER

INVENTORS H. M. BASCOM
R. F. MASSONNEAU
B. OSTENDORF, JR.
W. T. REA

BY R. Marino

ATTORNEY

SIGNALING SYSTEM

Original Filed Aug. 17, 1944

2 Sheets-Sheet 2

INVENTORS H. M. BASCOM
R. F. MASSONNEAU
B. OSTENDORF, JR.
W. T. REA

BY R. Mariño

ATTORNEY

Patented July 24, 1951

2,561,722

UNITED STATES PATENT OFFICE 2,561,722

SIGNALING SYSTEM

Henry M. Bascom, New York, Robert F. Massonneau, Scarsdale, Bernard Ostendorf, Jr., Jamaica, and Wilton T. Rea, Manhasset, N. Y., assignors to Bell Telephone Laboratories, Incorporated, New York, N. Y., a corporation of New York Original application August 17, 1944, Serial No. 549,842, now Patent No. 2,438,492, dated March 30, 1948. Divided and this application March 6, 1948, Serial No. 13,438

4 Claims. (Cl. 177—353)

This invention relates to signaling systems and more particularly to a system of the type disclosed in our Patent No. 2,438,492, dated March 30, 1948 which issued on our application Serial No. 549,842, filed August 17, 1944 of which the present application is a division and in which a predetermined number of half cycles of an alternating current is generated at a transmitter by a "start-stop" oscillator therein and received in a circuit which responds to both positive and negative half cycles of the transmitted wave, inverts the negative half cycles and causes both the positive half cycles and the inverted negative half cycles to be recorded by the tubes of a counting chain, said tubes conditioning, in succession, the tubes of a second chain for operating the tube therein last conditioned subsequent to the reception of the last half cycle of the signal train.

The invention covered by the present application is one which is adapted to transmit, receive, and indicate the number of half cycles in each of successive trains of half cycles having any desired number of half cycles in each train, or to automatically and repetitively transmit and receive successive trains of the same number of half cycles in each train.

A feature of the invention is a means whereby the tube operated to indicate the number of half cycles in a train transmitted and received, is not released and reoperated, if the succeeding train is composed of the same number of half cycles, but remains operated and continues in an operated condition as long as succeeding trains of the same number of half cycles are sent and received.

According to another feature of the invention, said operated tube is released if a succeeding signal train is composed of a different number of half cycles.

The various features of the invention will be understood from the following description when considered in connection with the accompanying two sheets of drawings, the scope of the invention being more particularly pointed out in the appended claims.

Figure 1:
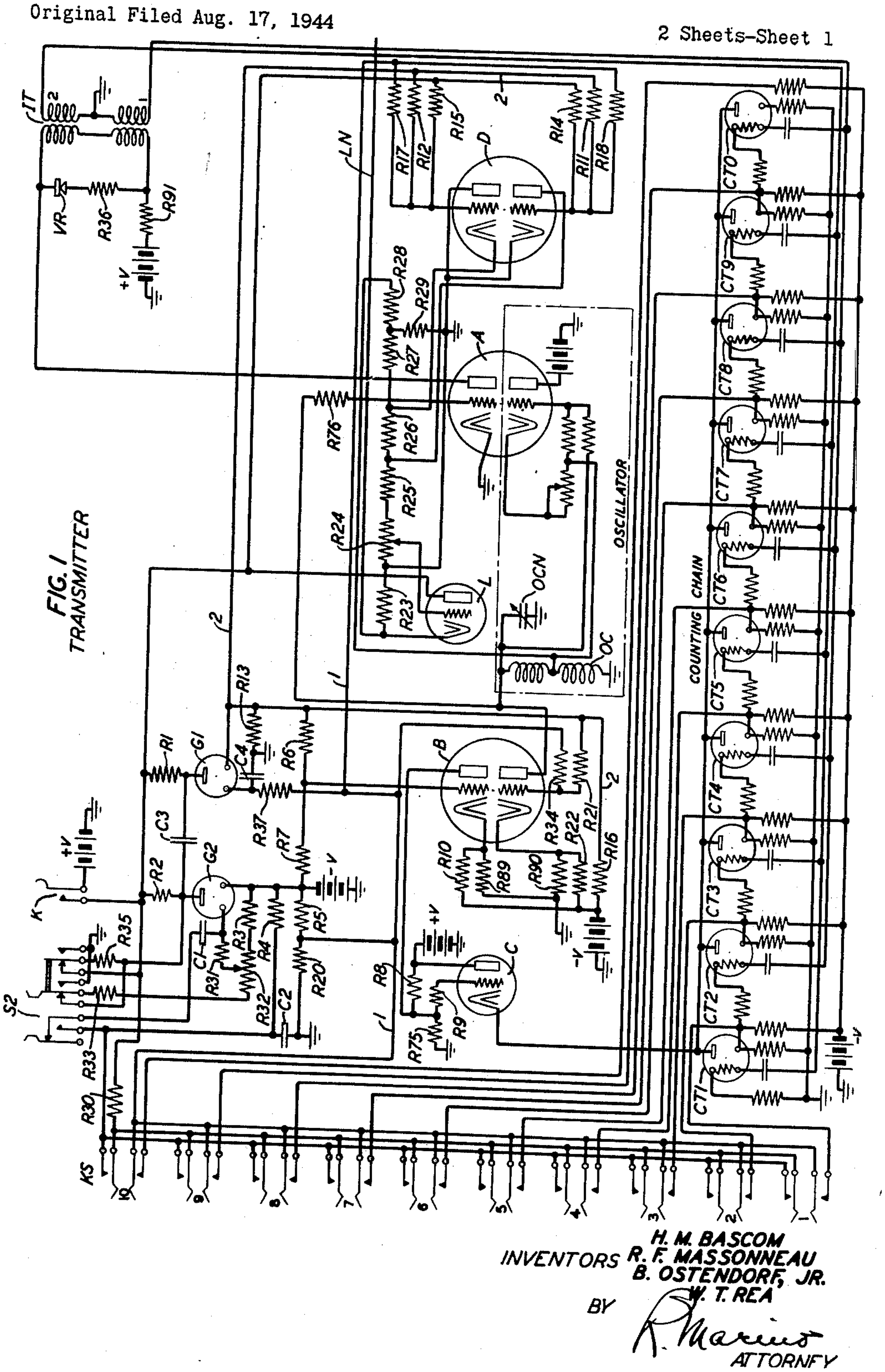
Figure 2:
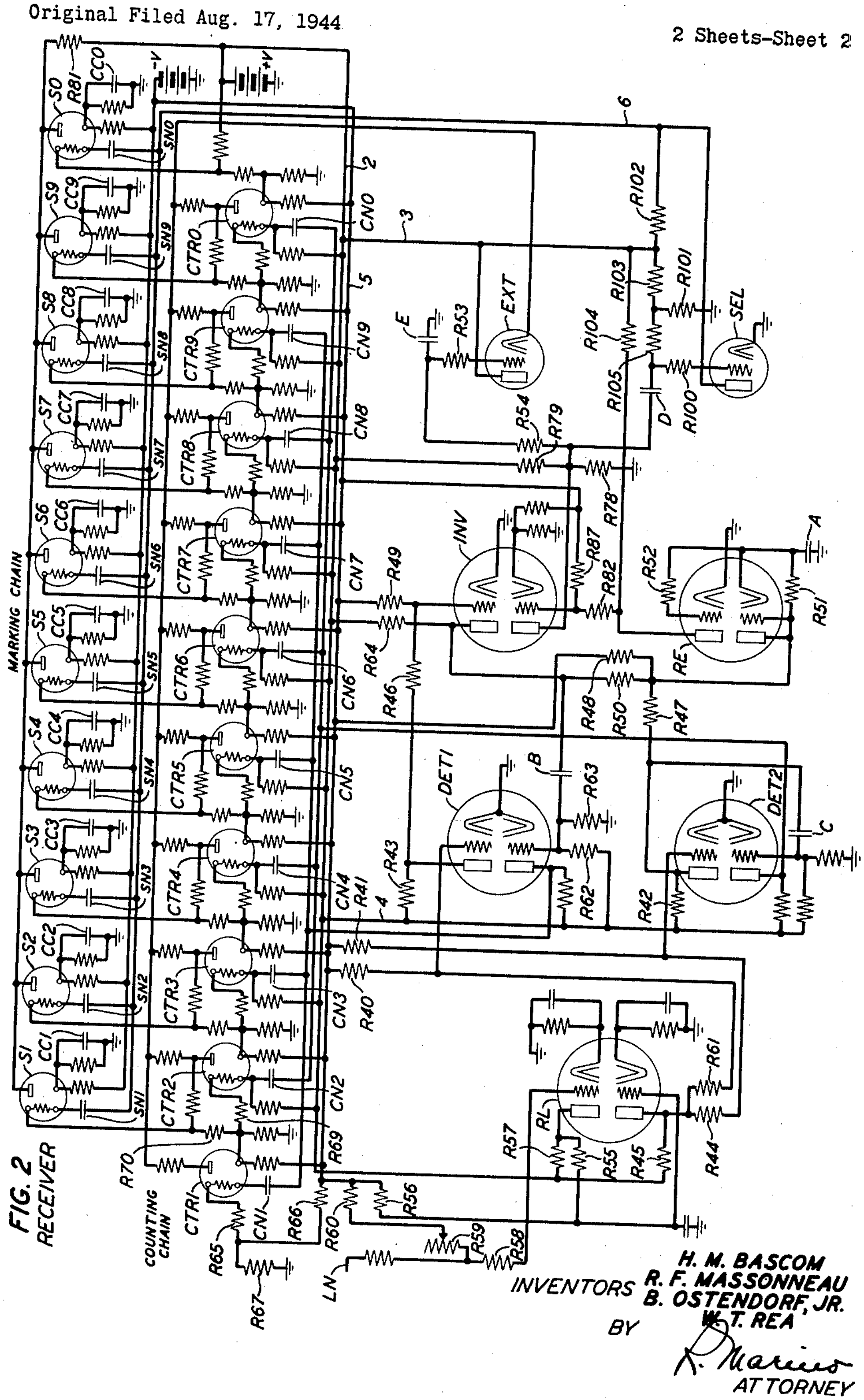

In the accompanying drawings, Fig. 1 shows the transmitter and Fig. 2 shows the receiver, said figures being placed adjacent to each other from left to right in the order named to disclose the invention completely.

The transmitter, shown in Fig. 1, comprises a start-stop oscillator of the type disclosed in Patent No. 2,370,685, issued to W. T. Rea and J. R. Wilkerson on March 6, 1945, a counting chain consisting of ten cold-cathode gas-filled tubes CT1 . . . CT0, a recycling circuit comprising two cold-cathode gas-filled tubes G1 and G2 by means of which single of repetitive transmission of a pulse train is accomplished, a line-coupling circuit comprising a potentiometer network R23 . . . R29 and a line-amplifying tube L by means of which the oscillator is coupled to the line, the double triode D by means of which it is insured that only the predetermined number of oscillations are caused to be applied to the line, an impulse-control circuit including the transformer IT and the upper triode of tube A by means of which each half cycle applied to the line is caused to be registered on one of the tubes of the counting chain CT1 . . . CT0, and a restoring circuit including the upper triode of tube B and the vacuum tube C which, under the control of the aforementioned recycling circuit, extinguishes the tube of the counting chain.

The receiver, shown in Fig. 2, comprises a two-stage direct-current amplifier employing a double-triode tube RL; a detector, inverter and impulse amplifier operating on odd half cycles, all of which comprise three of the triodes of the double-triode tubes DET1, DET2 and INV; a detector and impulse amplifier operating on even half cycles which comprises two triodes of the triode tubes DET2 and INV; a recycling circuit comprising the two triodes of vacuum tube RE and the vacuum tubes EXT and SEL; a counting-chain circuit consisting of ten cold-cathode gas-filled tubes CTR1 . . . CTR0; and a marking chain consisting of the ten cold-cathode gas-filled tubes S1 . . . S0.

Referring now more particularly to Fig. 1, the general operation of the transmitter is as follows:

During the interval when no signal is being transmitted, the oscillator OC is held in a non-oscillating condition and the line-coupling circuit is so conditioned as to prevent any impulses from being applied to the line. At this time, all the tubes CT1 . . . CT0 of the counting chain are maintained in the non-conducting condition. Now when a signal consisting of a certain number of positive and negative half cycles of a continuous alternating-current train is to be transmitted over line LN, a connection is made between a common conductor and a tube in the counting chain CT1 . . . CT0 that marks the last half cycle of the desired signal train. At this time the recycling tube G2 becomes energized to condition the tubes of the counting chain for operation, starts the oscillator OC and removes the block in the line-coupling circuit. The sine wave produced by the oscillator OC is thus permitted to be impressed on the line LN. Each time the oscillator completes a half cycle it causes an impulse-generating circuit to produce an impulse which fires one of the tubes of the counting chain, and each tube, as it fires, conditions the succeeding tube to be fired by the following impulse. Thus the tubes of the counting chain are fired in succession by the successive half cycles of the signal wave until the tube associated with the chosen selecting lead is fired. The firing of this tube applies a voltage to the recycling circlit, which causes a tube to be energized that quenches the oscillator and further causes the line-coupling tube to be so conditioned as to prevent the transmission thereafter of any further half cycles over the line. Thus at the proper instant, the transmission of the line signal over the line LN terminates at the end of the proper half cycle. If an even number of half cycles have been generated by the oscillator OC, the same will stop almost instantaneously. On the other hand, if an odd number of half cycles have been produced, the oscillator will continue operating to produce the succeeding even half cycle since the current in the elements of the oscillator is then flowing in the non-conductive direction of the oscillator "stop" tube. This half cycle, however, is prevented from being applied to the line by the "line-clamp" tube D.

After a short delay, one of the tubes of the recycling circuit fires, causing the tubes of the counting chain to be extinguished but still maintaining the oscillator stopped and the line-coupling tube in the non-transmitting condition. The circuit is thus returned to its initial condition, ready for the transmission of the next signal wave.

In the present embodiment of the invention, the transmitter has been arranged to send a desired digit either singly or continuously. For the latter type of operation, the recycling circuit is arranged so that, as long as a connection is maintained between the common lead and a selecting lead, the signal corresponding to the selection will be represented with a recycling pause between groups of half cycles of about ten milliseconds.

In the receiver, during an interval when no signal is being received, all tubes of the counting chain CTR1 . . . CTR0 are maintained in the non-conducting condition. When a signal is received, the first half cycle, which is positive, causes an essentially square negative wave, produced in the anode circuit of the first detector, to produce a positive square wave in the anode circuit of the inverter associated with this detector. This charges a condenser associated with the recycling circuit, the latter then acting to apply energizing potential to anodes of the tubes in the counting chain. Near the end of the first half cycle of the signal train, the first detector cuts off, causing the associated inverter and impulse amplifier to apply a positive-voltage impulse to the odd tubes of the counting chain. The first tube of this chain being the only one normally primed, fires, priming the first marking tube and the second counting tube. Near the end of the second half cycle, the second detector cuts off, applying a positive square wave to the recycling circuit. The condenser of this circuit is arranged so as to discharge with comparative slowness and hence to prevent the recycling function from occurring during the interval between the termination of the positive square wave produced by the first detector's inverter and the beginning of the one produced by the second detector. Near the end of the second half cycle, current flow is initiated in the anode circuit of the second detector, causing the associated impulse amplifier to apply a positive-voltage impulse to the even-number counting tubes. Since the second tube of this chain is now primed by the conducting condition of the first tube, it fires, priming the third counting tube and the second marking tube and removing the priming condition from the first marking tube. In a like manner the counting tubes fire in turn, each priming the corresponding marking tube and the following counting tube and removing the priming condition from the preceding marking tube.

When the last half cycle of the signal train is received, the positive square waves are no longer applied to the recycling circuit by the first detector's inverter and the second detector. The recycling circuit condenser discharges, causing the recycling circuit to apply a positive impulse to all marking tubes and immediately thereafter to extinguish all counting tubes. Since at this time the only primed marking tube is that corresponding to the last-fired counting tube, it is fired by the impulse and acts to extinguish any other marking tube that may previously have been fired. The desired selection is thereby registered and the counting chain is restored to its initial condition ready for the reception of the succeeding signal.

The counting chain having been restored to its initial condition and all of the marking tubes except said operated tube extinguished, said tube remains operated. If now, the recycling circuit causes a train of the same number of half cycles as the previous train to be transmitted, the operation of the counting tubes is repeated, as described above, but, when the positive impulse is applied by the recycling circuit to all marking tubes, the counting chain is in condition to prime only the marking tube which is already operated. No marking tube is, therefore, fired by said impulse but the operated marking tube remains operated. The same cycle of operations will be repeated if succeeding trains of the same number of half cycles are transmitted, the operated marking tube remaining operated and being the only one of the marking tubes operated. If, however, a train of a different number of cycles is transmitted, then when the positive impulse is applied by the recycling circuit to all marking tubes, a marking tube other than the operated tube will be primed and, therefore, fired by said impulse, and will extinguish the previously-operated marking tube.

The detailed description of the circuit now follows:

To prepare the transmitter for signal transmission, key K is depressed and the filament circuits (not shown) for all the vacuum tubes are activated. A breakdown potential difference for the main gap of recycling tube G1 is thereby applied between the anode and cathode thereof, positive potential from positive battery +V being applied through the contacts of key K and resistor R1 to the anode of tube G1, and negative potential being applied to the cathode of said tube through the voltage divider composed of grounded resistor R13 and serial resistors R7 and R6 connected, in parallel with resistor R16, to battery −V. The difference of potential thus applied between the cathode and anode of tube G1 is sufficient to cause the ionization of its main gap and the same is thereby rendered conducting to draw current therethrough over the above-traced circuit, whereupon certain specific potentials are made available at the terminals of various electrodes, terminals and conductors connected with the circuit as indicated below:

The current flowing through the cathode-anode circuit of tube G1 causes a potential to be available at the left terminal of resistor R6 which is applied by direct connection to the grid of the upper triode of vacuum tube B. The ohmic value of resistor R6 is so computed that the potential applied to this grid will be such that the resulting current flowing through the anode-cathode circuit of the upper triode of tube B will produce a potential on the grid of the extinguisher tube C which is so negative as to cause said tube to be virtually non-conducting but not wholly so as later explained. The circuit through the upper triode of vacuum tube B may be traced from negative battery −V, resistor R10, and a resistor R89 shunted to ground, cathode-anode of the tube to positive battery +V through resistor R8 and, in parallel therewith, resistor R75 to ground. The potential available at the junction point of resistors R75, R8 and R9 consequent to this flow of current is sufficiently less positive than the full potential of the battery +V as to be a little above the cut-off point of the tube C. Since the cathode of the tube C is connected to all of the anodes of the gas-filled tubes CT1 . . . CT0 and since the cathodes of the latter have a negative potential applied thereto from negative battery −V through an undesignated resistance individual to each of the cathodes, the trickle of an infinitesimal current flowing over the path from positive battery +V, anode-cathode of tube C, anode-cathode of each of the tubes CT1 . . . CT0, to negative battery −V via the undesignated resistance in series with each of the cathodes of the tubes CT1 . . . CT0, causes a positive potential to be available at the cathode of tube C which is applied to the anodes of each of the tubes CT1 . . . CT0, which potential, however, is less than required to sustain conductivity. However, since at this time all these tubes are inactive even though a microampere or two is flowing through them as above set forth, the application of less than sustaining positive potential to the anodes thereof by the cathode of tube C will have no effect.

The current through the anode-cathode circuit of tube G1 is also effective in producing another less-negative potential which appears at the right terminal of resistor R6 and is applied through resistor R21 to the grid of the lower triode of tube B. Since negative battery through resistor R22, with resistor R90 shunted to ground, is connected to the cathode of this lower triode, and the anode thereof is connected to the upper terminal of the oscillator coil OC (the lower plate of condenser OCN and the lower terminal of the coil OC both being connected to ground), current will flow through this lower triode to ground through the coil OC. The small potential developed at the upper terminal of the coil OC in consequence of this current flow holds the condenser OCN charged to the value thereof. Inasmuch as the current thus flowing is a direct current, oscillation of the energy stored in the condenser OCN and the coil OC is thus prevented so long as the current continues to flow through the lower triode of tube B. Under these conditions no oscillations will be produced for transmission over the line LN.

It will be observed that the upper grid of the "line-clamp" vacuum tube D is connected to the common terminal of resistors R12, R15, and R17 and that the lower grid is connected to the common terminal of resistors R11, R14 and R18. Resistors R14 and R15 are connected to positive battery +V via the contacts of key K; resistors R17 and R18 are connected, over conductor 1, to the lower moving contact of each of the numerical keys 1 . . . 10 of the key set KS and to a voltage divider comprising resistors R20 and R5 bridged between battery −V and ground; while resistors R11 and R12 are connected to the cathode of tube G1. Now resistors R11, R12, R14, R15, R17, R18 and resistors R20 and R5 (the latter two resistors comprising a voltage divider) are computed to such values that when tube G1 is rendered conducting, the grids of both triodes of tube D are rendered relatively positive, and if signal voltages be applied current will flow through both triodes effectively to short-circuit the line LN as subsequently set forth.

It will further be noted that the line LN over which the signals are to be transmitted is connected to the cathode of the line-amplifier tube L and, also, to the left terminal of the low-resistance resistor R23 which has its right terminal connected to ground. Resistors R24 . . . R28 form a network which interconnects the grid of the line-amplifier tube L and the mid-terminal of oscillating coil OC, and the object of this network is to couple the oscillator coil OC with the line LN and with means to stop instantly the transmission of signals over the line LN through the control exercised by both triodes of tube D. It will also be observed that the anode of the upper triode of tube D is connected to ground and that the cathode is connected to the aforementioned resistance network at the junction of resistors R26 and R27, whereas the anode of the lower triode is connected to the network at the junction of resistors R25 and R26 while the cathode is connected to ground. Since each triode of the vacuum tube D conducts in one direction only, since both triodes are oppositely connected and since, as before described, the grids thereof are kept at a relatively positive potential when tube G1 is conducting, it follows that one triode of tube D acts as a low-resistance circuit between the network and ground for currents generated in the direction of its conductivity and the other triode is a low-resistance circuit between the network and ground for currents generated in the direction of its own conductivity, thus preventing tube L from transmitting signals over the line. In other words, as long as key K alone is operated and none of the numerical keys 1 . . . 10 of key set KS is operated, the condition of the transmitter is such that the oscillator coil OC is blocked, less than sustaining potential is applied to the anodes of the tubes CT1 . . . CT0 of the counting chain and a high attenuation is established across the line LN by the triodes of tube D to prevent currents in either direction from getting through.

The present embodiment of the invention is arranged either for the repetitive transmission of the same digit or for the single transmission of one digit only, the digit transmitted in either case being controlled by whichever numerical key of the key set KS is depressed, key S2, in its operated position, controlling the transmission of a single train of impulses and in its normal position controlling the repetitive transmission of the same train of pulses indicated by the operated numerical key. Assume, therefore, that a single signal train of pulses corresponding to a "5" selection is to be transmitted. With key S2 operated, the numerical key 5 of key set KS is then operated. With key S2 operated, resistor R35 which is connected to the anode of the tube G2 and to the left plate of condenser C3 is grounded, and since current for the circuit of tube G2 is drawn from battery +V through resistor R2, the grounding of resistor R35 causes it to be connected in shunt with resistor R2 so that the potential available at the anode of tube G2 for applying a charge to the left plate of condenser C3 is less than that available through the anode of tube G1 for charging the right plate of said condenser. The operation of key 5 connects, through its lower contacts, the cathode of counting tube CT5 to conductor 1, while through its upper contacts it completes a charging circuit for condenser C2 of large capacity and condenser C1 of relatively smaller capacity, the charging circuit of condenser C2 extending from positive battery +V, contacts of key K, resistor R30, upper contacts of key 5, condenser C2 to ground. The charging circuit for condenser C1 extends from battery +V through contacts of key K, resistor R30, upper contacts of key 5, left operated contacts of key S2, condenser C1, resistor R31 to the potentiometer arm of resistor R32 (which is one of the resistance elements of the potentiometer network extending from battery −V to ground via resistors R3, R32, R33, right-hand inner operated contacts of key S2 to ground). The impulse thus created in the condenser C1 raises the potential of the control anode of G2 tube sufficiently to cause ionization of the critical gap thereof, inasmuch as the cathode is connected to the negative battery −V. This ionization spreads to the main gap since positive battery from source +V is applied to the anode of the tube via resistor R2 and the contacts of key K. The impulse applied to the control anode of tube G2 is delayed by the time required to charge condenser C2 since this condenser being of larger capacity than that of condenser C1 delays the full charging of the latter. This arrangement prevents the transmitter from being started prematurely in case the upper contacts of key 5 close before its lower contacts. This, of course, could be obviated by a sequence adjustment of the key contacts.

There is, moreover, a relatively large capacity C3 connected between the anode of tube G1 and that of tube G2. During the conductivity of tube G1, the right plate of this condenser acquires a charge, of course, which depends upon the potential available at the anode of the tube G1. When tube G2 fires, a parallel path to resistor R35 is established through tube G2 thus lowering the potential at the anode of tube G2. The lowering of the potential on the left-hand plate of condenser C3 (connected to the anode of tube G2) causes condenser C3 to begin to charge and since the charging current is drawn through resistor R1, the anode of tube G1 is momentarily made much less positive and the latter tube is extinguished. A negative source of voltage is furnished to the cathode of tube G1 via its connections to the junction of resistors R6, R16 and R13, which resistors form part of a potentiometer circuit extending from negative battery −V, via the combination of resistors R16 in parallel with serially-connected resistors R7 and R6, and thence via resistor R13 to ground. The extinguishing of tube G1 causes the flow of plate current in this potentiometer circuit to cease, and the potential of the cathode, and of lead 2 connected thereto to become more negative. The grids of both triodes of tube D, by virtue of their connection to lead 2 via resistors R11 and R12, assume a negative polarity, said grids now effectively preventing any current from flowing through their associated anode-cathode circuits so that any energy which is thereafter produced by the oscillator is applied to the amplifying tube L instead of being short-circuited to ground through the triodes of tube D. The signal applied to the grid of tube L will thereafter partly be carried to ground over resistor R23 and partly applied over the line conductor LN to the receiver.

The extinguishing of tube G1 further causes the potential at the junction of resistors R7 and R6 to become more negative, and this potential is applied to the grid of the upper triode of tube B. In a similar manner the extinguishing of the tube G1 causes the potential at the junction of resistors R21 and R34 to become more negative and this potential is applied to the grid of the lower triode of tube B. The lower triode of tube B, it will be remembered, operates to supply the oscillator coil OC with direct current during the times that the grid of said lower triode is positive; that is, during the time when tube G1 is conducting. Hence, when tube G1 is extinguished and the lower grid of tube B is made negative as an indirect result of the conductivtiy of tube G2, this current is suppressed and the energy stored in the oscillator coil OC and condenser OCN begins to oscillate to produce a continuous train of alternating-current waves as set forth in the above-mentioned patent, the lower triode of tube A functioning to supply the required energy to produce sustained oscillations. Since the anode of the lower triode of tube B is connected to the common terminal of oscillator coil OC and condenser OCN, the first half cycle of the current will be positive.

It will be remembered that during the conductivity of tube G1 the current flowing in the cathode-anode circuit thereof caused the grid of the upper triode of tube B to be maintained at a positive potential so that this triode would conduct and that, in consequence, a relatively-negative potential was applied to the grid of tube C which established an inappreciable current through the anode-cathode circuit thereof, including the cathode-anode path of each gas-filled tube in the counting chain CT1 . . . CT0. Now when tube G1 is extinguished, cessation of the anode-cathode current through the upper triode of tube B causes the anode to become more positive in consequence of which the grid of tube C is made more positive. The greater current now flowing through anode-cathode circuit of tube C raises the available potential at the anode of each of the counting tubes CT1 . . . CT0 to a value such that, when one of them is rendered conducting through its control gap as hereinafter set forth, the voltage available at the anode of that tube from the cathode of tube C will cause said tube in the counting chain to become conducting through its main gap, thus causing it to remain operated when the initial breakdown voltage between its cathode and control anode is removed.

The output of the oscillator is picked off the midterminal of the oscillator coil OC and applied to the resistor R28 whence, through resistor R29, part of it is drained off to ground and whence, through a voltage divider composed of resistors R27, R26, R25 and a portion of the resistor R24, a part of it is applied to the grid of the line-amplifying tube L, whereby the anode-cathode current in this tube is caused to be modulated in accordance with the character of the oscillating voltage applied to the grid thereof which, in turn, is proportional to, and in accordance with, the character of the voltage produced by the oscillator coil OC. The anode-cathode oscillating current in the line tube L passes through resistor R23 which is connected between the cathode of the tube and ground, and the voltage drop developed across this resistor is applied to the line conductor LN for transmission thereover to the receiver which, as set forth hereinafter, responds to the oscillations and provides a suitable indication thereof. It should be noted at this point that if the grids of both triodes of tube D were not rendered negative when tube G1 is extinguished, the oscillating energy, instead of being applied to the line LN as above noted, will pass to ground, the positive half cycles of the energy passing through one triode of tube D and the negative half cycles passing through the other triode of tube D. The fact that the grids of this tube are rendered negative at the time tube G1 is extinguished causes the triodes of this tube to present practically an open circuit to the potentiometer network between the oscillator and the grid of the line-amplifier tube L so that the oscillations are reproduced in tube L and passed into the line conductor LN.

The upper triode of tube A together with transformer IT form an impulse-producing device. The grid of this triode is connected serially through the high-resistance resistor R76 to the common terminal of the oscillating coil OC and condenser OCN, and the alternating voltages produced by the oscillator correspondingly alter the potential of said grid. These voltages, however, are so large that they drive the grid from the point of cut-off to a positive value, a fact which, coupled with the additional fact of the high resistance of resistor R76 causes an anode-cathode current flowing through the upper triode of tube A to be essentially a "square-top" wave. Now the first half cycle produced by the oscillator is positive and during this period current will flow in the upper triode of tube A through a circuit which traces from positive battery +V through resistor R91, the two left, or primary, windings of transformer IT, through the anode-cathode path, to ground on the cathode. At the end of the first half cycle, the grid of the upper triode of tube D becomes negative with respect to its cathode, and anode current, therefore, ceases to flow through the primary of transformer IT. The cessation of current is very abrupt due to the square-top character of the wave, and a sharp impulse is thereby caused to be generated in the secondary winding of transformer IT, which appears as a positive impulse at terminal 2 connecting with the control anodes of the odd numbered tubes CT1 . . . CT9, and as a negative impulse at terminal 1, which is connected to the control anodes of the even-numbered tubes CT2 . . . CT0. The control anode of tube CT1, however, is at ground potential. Since the cathodes of all the counting tubes CT1 . . . CT0 are connected to negative battery —V through appropriate resistances, the application of the positive impulse to the control anode of tube CT1 via its associated undesignated condenser raises the potential of said control anode to a value which establishes a control-gap breakdown difference of potential between it and the negative potential available at the cathode, causing the control gap to ionize. Since an appropriate positive potential is, at this time, also applied to the anodes of all counting tubes from the cathode of tube C, as previously explained, ionization of tube CT1 spreads to the main gap, in consequence of which the tube will remain in a conducting state upon the termination of the impulse, the current-flow path through the main gap of tube CT1 tracing from positive battery +V through the anode-cathode path of tube C, anode-cathode path through the tube CT1, and the undesignated cathode resistance to negative battery —V. The flow of current through the cathode resistor of tube CT1 produces a relatively-positive potential at the cathode which is applied to the control anode of the next tube CT2 through an interconnecting resistor. This potential, however, is not sufficient to cause the breakdown of the control gap of tube CT2, said potential serving only to "bias" the control anode of this tube for breakdown purposes upon the application thereto of an additional potential over that which supplies the bias. The other odd-numbered tubes to whose control anodes the positive impulse from transformer IT is applied at the time it is applied to the control anode of tube CT1 are not fired with tube CT1 because, while the control anode of tube CT1 is normally at ground potential, the control anodes of the other odd-numbered tubes are maintained at a voltage more negative than ground by means of the resistance network interconnecting —V and ground.

At the end of the second half cycle, current flow is again initiated in the plate circuit of the upper triode of tube A, the change in current being effective to produce an impulse in the primary windings of transformer IT which is opposite in polarity to that produced at the end of the first half cycle and, consequently, causing a positive impulse to appear at the No. 1 terminal of the secondary windings of transformer IT and a negative impulse at the No. 2 terminal. Since the control anode of tube CT2 is already relatively positively biased by the cathode potential derived from the conductivity of tube CT1, the positive impulse now applied to the control anode of tube CT2 will cause it to fire, in turn conditioning the control anode of tube CT3 to be responsive to the next positive impulse to be applied thereto from the No. 2 terminal of transformer IT. A series combination of varistor VR and resistor R36 shunted across the two primary windings of transformer IT serves to equalize the amplitude of the impulses produced at the ends of the odd and even half cycles, which amplitudes would otherwise be unequal because the inductance of the primary winding causes its current to rise more gradually at the ends of even half cycles than it decays at the ends of odd half cycles.

In the above manner, counting tubes CT1 . . . CT5 fire, each in turn conditioning the succeeding tube. When, at the end of two and a half cycles, tube CT5 fires, the flow of current between its anode and cathode renders said cathode relatively positive. Since the cathode of this tube is connected to conductor 1 through the lower contacts of the numerical key 5, and the conductor is, in turn, connected to the grid of the lower triode of tube B via resistor R34 and to the grids of both triodes of tube D via resistors R17 and R18, all of said grids are rendered positive. As a result the anode-cathode impedance of both triodes of tube D is reduced to a fairly low value, the signal from the oscillator is greatly attenuated across the potentiometer resistor R24, and the tube L is prevented, after the transmission of two and one-half cycles, from applying any further signal energy whatsoever to the line conductor LN.

Due to the fact that, at the end of the two and one-half cycles, current in the oscillator OC is flowing toward ground and since the upper terminal of the oscillator is connected to the lower anode of tube B, the triode of which this anode is a part will fail to conduct even though its grid is positive with respect to its cathode. The oscillator OC, therefore, fails to stop until, at some time later near the end of the third cycle, the current reverses, the anode of the lower triode of tube B becomes more positive than the cathode and current again flows through this triode to thereby return the oscillator its steady-state stopped condition as originally described. This, however, will in no way affect the line since, as before stated, the conductivity of the two triodes of tube D prevents such voltage from being impressed on the grid of tube L even though the oscillator OC is still functioning.

The positive potential upon conductor 1 is also applied to the control anode of tube G1 through resistor R37. After a delay due to the time required to charge condenser C4, tube G1 fires across its control gap and thence across its main gap to cause its anode potential to become more negative and its cathode potential to become more positive. Due to the connection of condenser C3 between the anode of tube G1 and that of tube G2, and due to the fact that this condenser is charged to the voltage of the drop across resistor R2, the fact that the anode of tube G1 is rendered more negative causes an impulse to be generated which is transmitted across the condenser C3 to render the anode of tube G2 also more negative. In consequence, tube G2 is extinguished. Further, due to the conductivity of tube G1, the left terminal of resistor R6 is made more positive than it was before, and this positive potential is, of course, applied to the grid of the upper triode of tube B to cause current to flow through its anode-cathode circuit. The anode being rendered more negative by the current flow, the relatively-negative voltage thereof is applied to the grid of tube C in consequence of which the current through the anode-cathode is reduced and the potential of the cathode becomes sufficiently negative so that the voltage applied to the anodes of the counting tubes is insufficient to maintain a discharge. Tubes CT1 to CT5 therefore become extinguished.

The extinguishment of tube CT5 causes conductor 1 to become more negative, but the effect of this on the grids of tube D and that of the lower triode of tube B is compensated for by the fact that the cathode of tube G1 has become positive by an equal amount. The reason for this is because the more positive potential at the cathode of tube G1 is applied to the lower grid of tube B via resistor R21 at the same time that conductor 1 supplies a less-positive voltage to the same grid via resistor R34. In the same manner, the more positive potential on the cathode of tube G1 is applied to the two grids of tube D via resistors R12 and R11 at that same time that conductor 1 supplies a less-positive voltage to these grids via resistors R17 and R18. Since the firing of tube G1 and the extinguishing of tube CT5 occur practically simultaneously, the grids of the above triodes remain at a substantially-constant potential. The circuit is thus returned to its initial condition except for the fact that, since numerical key 5 is closed, condensers C1 and C2 remain charged over previously described paths, and, therefore, no impulse will be produced across condenser C1 to fire tube G2. To produce the impulse, numerical key 5 is released and key 5 or some other numerical key reoperated. Upon release, condensers C2 and C1 are discharged, and, upon reoperation, condenser C2 will be charged and later condenser C1 will be charged as previously described, producing an impulse that will cause tube G2 to fire and the operations above described to be repeated.

Other signals may be sent in the same manner as above described except that in the case of even-numbered signals the oscillator stops immediately at the end of the last half cycle of the signal since the direction of current flow at this time is in the conductive direction of the lower triode of tube B and the voltage applied to the plate of this triode is more positive than that of the cathode.

For the continuous transmission of the same signal only the numerical key corresponding to the number of the signal to be transmitted is operated, key S2 being kept in its unoperated condition. At the end of each signal train when tube G1 has fired and extinguished tube G2, the latter tube refires across its control gap after a delay which may be controlled by the adjustment of the potentiometer R32. The reason for this is that when tube G1 extinguishes tube G2, the anode potential of the latter becomes more positive with respect to the potential supplied by battery −V at the cathode. However, due to the fact that key S2 is normal, the control anode is tied to the main anode via resistors R31, R32 and R33. Hence the potential of the control anode similarly becomes more positive with respect to the potential available at the cathode. Both these potentials, however, are derived from the charging circuit of condenser C3 which includes battery −V, resistors R3, R32, and R33, right inner normal contacts of key S2, condenser C3, resistor R1, contact of key K to positive battery +V; in parallel therewith there is also the potential available at the lower terminal of resistor R1 due to the conductivity of tube G1, and also the parallel resistor R2 to battery +V through the contacts of key K. The potential applied to the control anode of tube G1, being derived from the above network and being a function of time, can be derived for any particular time value by suitably adjusting the potentiometer R32. When the appropriate value of potential is reached, tube G2 will fire across its control gap and the operations above described will be repeated. Thus, without any further operation of keys, repetitive signals will be transmitted.

The delay feature in the firing and extinguishing of tubes G1 and G2 and the correspondingly necessary joint control of the recycling operations by the potentials on conductor 1 and at the cathode of tube G1 are necessary in order to obtain a short recycling time in continuous sending. In the transmission of a "1" signal, for example, the duration of the signal may be 2 milliseconds. If tube G1 were to be fired immediately by the positive potential on conductor 1, it could remain extinguished for only 2 milliseconds whereas the deionization of a tube of this type requires at least 5 milliseconds and the value of condenser C3 is such as to delay the rise of plate potential sufficiently to permit such time for deionization. However, with a 4-millisecond delay in the firing of tube G1 (which can be arranged by the proper choice of values for condenser C4 and resistor R37), it can remain extinguished for 6 milliseconds in the transmission of a "1" signal. Thus the circuit is so arranged that during continuous transmission of this shortest signal combination, and with a recycling time of 10 milliseconds, tubes G1 and G2 commutate at approximately equal intervals.

The operation of the receiver will now be described. It is assumed that filament current for the vacuum tubes of the receiver flows through the filaments thereof from any suitable source of current (not shown) and that, in consequence, the respective cathodes of the tubes are in an emitting condition. In the no-signal condition, no current flows through the upper triode of detector tube DET1 since the grid thereof is maintained at a cut-off negative potential which is derived from a voltage divider comprising resistors R40 connected to negative battery —V through conductor 5, R61 and R45, the latter being connected to a positive source of potential +V over conductor 2. The ohmic values of resistors R61 and R40 are computed to a value that will permit no current flow through the anode-cathode circuit of the upper triode of tube DET1. On the other hand, current is flowing through the anode-cathode circuit of the upper triode of detector tube DET2 because the potential at the grid thereof is available from the voltage divider comprising resistors R41 connected to negative battery —V over conductor 5, and resistors R44 and R45, the latter being connected to positive battery as above mentioned. The ohmic value of resistors R44 and R41 is computed to a value that will permit current flow through the anode-cathode circuit of the upper triode of tube DET2, the path of said circuit tracing from positive battery +V to conductor 2, conductor 4, resistor R42, through the anode-cathode path within the upper section of tube DET2, to cathode ground. The grid of the upper triode of the inverter tube INV is connected to the anode of the upper triode of tube DET1 through the voltage divider comprising resistors R46 and R49, the latter being connected to negative battery —V, and the resistors of this voltage divider are computed so that the normal potential on said grid permits current to flow through the upper anode-cathode of said tube INV, the path of said circuit tracing from positive battery +V, conductor 2, resistor R64, through the upper anode-cathode path of tube INV to cathode ground. Thus current flows in the anode-cathode circuits of the upper triodes of tube DET2 and the inverter tube INV and the potentials on the anodes of the upper triodes of both tubes are applied through resistors R47 and R50, respectively, to the plate and grid of the lower triode of tube RE. Resistor R48 is connected to and through R51 to condenser A and to battery —V over conductor 5 so that, with the positive potentials on the anodes of the upper triodes of tubes DET2 and INV obtaining at this time, the potential at the junction point is negative with respect to ground and causes condenser A to be charged negatively through resistor R51. The negative potential on condenser A is applied to the grid of the upper triode of the recycling tube RE via resistor R52, thereby causing no current to flow through the anode-cathode circuit thereof. Since the grid of the lower triode of the inverter tube INV is connected to the upper anode of tube RE through resistor R82, the potential on this grid, as modified by the connection of said grid to negative battery —V via resistor R87 is, therefore, positive with respect to its cathode. This permits current to flow through the anode-cathode of the lower triode of tube INV, and the potential on the anode of this triode, which is relatively negative due to the flow of plate current from positive battery through resistor R79, is transmitted to the grid of the extinguishing tube EXT through resistors R54 and R53. The value of this potential causes only a very slight current flow through the anode-cathode of tube EXT and the anode-cathodes of each of the gas-filled tubes of the counting chain CTR1 . . . CTR0 to negative battery —V, which maintains the cathode potential of tube EXT sufficiently negative that the voltage applied to the anodes of the tubes CTR1 . . . CTR0 of the counting chain is insufficient to maintain a discharge through any of these last-mentioned tubes.

In the no-signal condition upon line LN, the grid of the upper triode of the line-receiving tube RL is maintained at a slightly negative potential through resistor R58, variable resistor R59 and resistor R60 which is connected to negative battery —V. Under this condition, some current flows through the upper-triode path which extends from positive battery +V, resistor R57, anode-cathode path to cathode resistance ground. The anode of the upper triode of tube RL is, therefore, at a potential less positive than the full positive battery potential, and this potential, as modified by potentiometer comprising resistors R55 and R56 to negative battery —V, is connected to the grid of the lower triode of this tube, thereby maintaining said grid at a potential which will cause some current to flow through the anode-cathode circuit thereof, said circuit extending from positive battery +V, resistance R45, anode-cathode path to cathode resistance ground. In effect, this arrangement makes the tube RL a two-stage direct-current amplifier since a change of potential on the grid of the upper triode will cause an amplified voltage change on the anode which, through resistor R55, is applied to the grid of the lower triode, causing a further amplified change in voltage to appear in the anode of said lower triode.

The first half cycle of the incoming signal, which is positive, is applied to the grid of the upper triode of tube RL, causing the potential thereof to be rendered less negative. More current now flows through the anode-cathode circuit of the upper triode of this tube, and the potential developed across resistor R55 as a result of the increase in current renders the grid of the lower triode more negative than previously, and thereby increases the potential of the lower anode. For small values of signal voltage this increase in potential is a two-stage amplification of the potential of the first half cycle of the incoming signal. For larger values of signal voltage the peak of the half cycle may be flattened as the grid of the lower triode attains a potential which causes the cessation of current in the anode-cathode path, but this will not adversely affect the action of the receiver.

The potentials across the voltage divider comprising resistors R61 and R40 and across the voltage divider comprising resistors R44 and R41 which result from the amplification of the signal are applied, respectively, to the upper grids of detector tubes DET1 and DET2. Since the first received signal is positive, these grids become more positive and, at some value of signal which exceeds the noise level on the line circuit LN, current flows through the anode-cathode circuit of the upper triode of detector tube DET1. The current flow in said triode causes the potential of its anode to become more negative, and this more negative potential is applied, via resistor R46, to the grid of the upper triode of inverter tube INV. The anode potential of this triode now becomes more positive, but this has little effect on the grid of the lower triode of tube DET1 to which it is connected by way of condenser B since its grid is already positive with respect to its cathode due to the potential available on said grid as a consequence of its connection to the common terminal of resistors R63 and R62. Since little or no current is flowing through the upper triode of tube INV, the anode thereof is relatively positive by virtue of the small voltage drop in resistor R64 which interconnects said anode and positive battery +V on conductor 2. Hence, while this anode is relatively positive during the time that no current flows through the associated anode-cathode circuit, this positive potential is also available at the anode of the lower triode of the recycling tube RE, which is used as a diode, so that current flows through the anode-cathode circuit and a positive charge is applied to condenser A. Since the plate of this condenser is connected to the grid of the upper triode of the recycling tube RE via resistor R52, said upper grid likewise acquires a positive potential the effect of which is to cause the associated upper anode of this tube to become more negative, carrying with it the grid of the lower triode of tube INV. This causes the potential at the anode of the latter triode of tube INV to become more positive, carrying the grid of tube EXT towards positive also. Thus, the cathode of tube EXT is permitted to become sufficiently positive to apply to the anodes of the counting tubes CTR1 . . . CTR9 an anode-to-cathode potential greater than their sustaining potentials.

The change toward positive of the anode of the lower triode of tube INV applies a positive impulse through condenser D to the grid of triode SEL. Since said grid already has a positive potential applied to it from resistors R100, R105 and R103, the anode-cathode current is little effected and hence the anode potential remains substantially constant. It should be remembered that during the reception of the first half cycle of signal, positive potential was not only applied to the grid of the upper triode of tube DET1 as already explained, but also to the grid of the upper triode of tube DET2. Since this merely constituted an increase of the existing positive potential applied through resistor R42 to said grid, and in consequence of the large value of resistor R42, only a small increase in grid current results, and there is practically no change in the anode-cathode current in the upper triode of tube DET2. The anode potential therefore remains substantially constant.

Near the end of the first half cycle of the sinusoidal wave produced by the transmitter, the grid of the upper triode of tube DET1 becomes negative with respect to the cathode, the signal being applied to the grid of this upper triode through the two-stage amplifier comprising both triodes of tube RL. The anode potential of the anode of the upper triode of tube DET1, therefore, increases in a positive direction which, in turn, causes the grid of the upper triode of tube INV also to become more positive. The increased current now flowing in this last-mentioned triode causes the potential on its anode to become more negative. The resulting negative impulse, applied through condenser B, to the grid of the lower triode of tube DET1 causes a positive impulse, produced on the anode of this triode, to be applied through condensers CN1, CN3, CN5, CN7 and CN9 to the control anodes of the odd-numbered tubes CTR1, CTR3, CTR5, CTR7 and CTR9 of the counting chain. Unaided, the magnitude of this impulse is insufficient to fire the control gaps of these tubes, but since the control anode of tube CTR1 is provided with a positive bias relative to its cathode through resistors R65, R67 connected to ground and resistor R66 in parallel thereto connected to negative battery −V, tube CTR1 fires across its control gap to the negative potential at the cathode supplied from battery −V through an undesignated resistor. The tube then fires across its main gap to the positive potential supplied by the cathode of tube EXT and remains in a conductive state until this potential is removed or reversed.

When tube CTR1 fires, the current drawn through its anode-cathode circuit causes the cathode potential to become more positive, carrying with it, in the positive direction, the control anodes of tubes CTR2 and S1, the latter tube being the first tube in the marking chain. The potential for the control anode of tube CTR2 is applied through resistor R69 while that for the control anode of tube S1 is applied through resistor R70. The applied potentials are, however, insufficient to fire either of these two tubes because, in the case of tube CTR2, the difference in potential between the control anode and the cathode will not reach the breakdown value until a positive impulse is applied to its control anode by way of condenser CN2. Since the positive impulse which fired tube CTR1 is also applied to control anodes of all the odd-numbered tubes but not to the control anodes of the even-numbered ones, tube CTR2 cannot be fired on the same impulse which fired CTR1. In the case of tube S1, the potential applied to its control anode is insufficient to fire said gap in the absence of large positive potential at the plate of tube SEL.

Soon after the beginning of the second half cycle of the signal train, which second half cycle is negative, the potential on the grid of the upper triode of tube DET2 becomes sufficiently negative to cut off the flow of anode-cathode current. The resulting positive potential on the anode is applied, through resistor R47 and the lower triode of tube RE, used as a diode, to condenser A. As previously explained, this condenser is likewise kept in a charged state during most of the period of the reception of a positive half cycle by the anode potential on the anode of the upper triode of tube INV, said potential being applied through resistor R50 and the lower diode of tube RE. In other words, during the reception of a train of positive and negative half cycles, condenser A is continually charged. Now resistor R51, which is virtually short-circuited during the charging of condenser A, appears in the discharge circuit of this condenser, which discharge circuit terminates at the potential available at the common terminal of resistors R48, R50 and R47. The ohmic resistance of resistor R51 and the capacity of condenser A are so computed that the time constant on discharge is long enough to prevent appreciable discharge of the condenser during the short instants between the latter part of each half cycle and the early part of the following half cycle and, therefore, the potential on the grid of the upper triode of said tube RE (via resistor R52) is prevented from becoming negative.

Near the end of the second half cycle, the grid of the upper triode of tube DET2 becomes positive with respect to the cathode. The anode potential now becomes more negative, applying a negative impulse through condenser C, to the grid of the lower triode of this tube. The resulting positive impulse on the anode of this lower triode is applied, through condensers CN2, CN4, CN6, CN8 and CN0 to the control anodes of the even-numbered tubes CTR2, CTR4, CTR6, CTR8 and CTR0. Unaided, the magnitude of this impulse is insufficient to fire the control gaps of these tubes. Since, however, the current in the cathode circuit of tube CTR1 has caused a positive bias to be applied to the control anode of tube CTR2 as previously explained, the latter tube is fired by the impulse. The resulting flow of current in the main gap of tube CTR2 causes the cathode potential to become more positive and the anode potential more negative. The former causes a positive bias to be applied to the control anodes of tubes CTR3 and S2, and the latter causes a neutralization of the positive bias applied to the control anode of tube S1 by the flow of current in the cathode resistor of tube CTR1. In this way, the tubes CTR of the counting chain are fired in succession, each in turn biasing the control anode of the corresponding marking tube and the succeeding counting tube, and neutralizing the bias of the preceding marking tube. It will now be shown that, in response to operations following the reception of a last pulse or half cycle in a signal train, the marking tube corresponding to the last-fired counting tube will also be fired and remain in the conducting state, thus indicating by its numerical designation the number of half cycles received. This tube remains in a fired condition until the last half cycle of a succeeding signal train of a different number of half cycles is received, at which time the marking tube previously fired is extinguished and the marking tube indicative of the last pulse in the second signal train is fired. Obviously, if both signal trains contain the same number of half cycles, the same marking tube will remain lighted.

Suppose, for example, that signal "5" is being received and that a previous signal train of three half cycles ("3"), having been received, will have caused marking tube S3 to have become fired and to have remained lighted in the manner shortly to be explained. After the end of the fifth half cycle, no further signals will be received. Condenser A will then discharge through resistor R51 to the point where the grid of the upper triode of the recycling tube RE becomes negative with respect to its cathode. The flow of anode current in this triode will thus be interrupted and the anode potential will become more positive, carrying with it the grid of the lower triode of tube INV. The anode potential of this latter triode becomes more negative applying a negative impulse through condenser D, to the grid of tube SEL. The resulting positive anode potential of tube SEL causes a positive impulse to be applied through conductor 6 and condensers SN1 . . . SN0 to the control anodes of marking tubes S1 . . . S0, firing tube S5 since it is the only one of the marking tubes which is primed at this time.

In connection with tube S3, assumed to be previously conducting, the potential of its cathode is maintained at a constant positive valve by the charge in condenser CC3 accumulated thereon by the voltage drop across the cathode resistor. It will also be noted that the anode current for any of the marking tubes is drawn through the resistor R81, and the drop across this resistor, with one marking tube conducting, will still provide sufficient anode potential so that the difference between said anode potential and the potential maintained at the cathode of a conducting marking tube, like tube S3, by its associated charged condenser CC3, will be sufficient to keep the tube in a conducting condition. Now when tube S5 is fired subsequent to the reception of the fifth (and last) half cycle of the second signal train, the current through resistor R81 is increased since current now flows through both tubes S3 and S5. As a consequence, the voltage across resistor R81 is also increased and the voltage available at the anode of the marking tubes is reduced a corresponding amount. Since condenser CC3 is charged to a positive potential and condenser CC5 is uncharged at the time tube S5 is fired, the potential difference between the cathods and anode of tube S3 is now reduced below the sustaining value, in consequence of which tube S3 is extinguished. On the other hand, the potential difference between the anode and the cathode of tube S5 is the full difference between the potential on the anode and that of the potential divider connected between the negative battery —V and ground, and is sufficient to maintain the tube S5 in a conducting state.

It is now evident that if the second signal train contains the same number of half cycles as the first signal train, said first train already having caused the lighting of the appropriate marking tube, this tube remains lighted continuously. Thus, if tube S5 is lighted, the sustaining voltage is undisturbed between the successive signals. Although the control anode of tube S5 will be primed in the regular course of operations as already described, such priming will, of course, have no effect upon the tube since it is already conducting.

The more negative potential on the anode of the lower triode of tube INV is applied to the grid of tube EXT by way of resistors R54 and R53, from whose junction point a condenser E is bridged to ground. Said condenser delays the change of potential at the grid of tube EXT sufficiently long to permit the above-described action of tube SEL to take place. Thereafter, the negative potential on the grid of the tube EXT causes the cathode thereof to become more negative. The potential applied thereby to the anodes of the counting tubes CTR1 . . . CTR0 is now no longer sufficient to sustain a discharge. Hence, counting tubes CTR1 . . . CTR5 extinguish. The marking tube S5, however, remains lighted. Otherwise the circuit is returned to its initial condition, ready for the receipt of the next signal train.

While we have described our invention in connection with its application to a specific signal transmitting and receiving arrangement, it is understood that various other applications and embodiments thereof may be made by those skilled in the art without departing from the spirit of the invention as defined by the scope of the appended claims. Thus, a relay may be included in the anode circuit of each of the marking tubes, which will operate when the tube is rendered conducting, in turn operating a suitable register circuit that includes steering devices for switching the relays from one register to the next, thus registering a series of numbers indicative of the number of half cycles in each of the signal trains received.

It is also apparent that, by doubling the number of counting tubes and marking only every other pulse, the signal transmitted can be represented by the number of whole cycles instead of half cycles. Other modifications and adaptations of the invention will be apparent to those skilled in the art.

The terms and expressions which we have used in reference to this invention and its elements are used as terms of description and not of limitation. We have no intention in the use of said terms and expressions of excluding thereby equivalents or modifications of the features shown and described, or parts thereof, but on the contrary intend to include therein any and all equivalents and modifications which may be employed without departing from the spirit of the invention.

What is claimed is:

1. In a signaling system, means for producing a current wave substantially sinusoidal in character, means for counting a predetermined number of half cycles of said wave, receiving means, means for transmitting the counted number of half cycles to said receiving means, means for counting the number of half cycles received, means responsive to said means for counting the number of half cycles received for operating one of a plurality of gas-discharge devices indicative of the number of half cycles received, means for again counting and transmitting to said receiving means the same number of half cycles, and means for maintaining said operated gas-discharge device in its operated condition during and after the reception of said last-mentioned number of half cycles.

2. In a signaling system, means for producing a current wave substantially sinusoidal in character, means for counting successive trains of half cycles of said wave, each train having the same predetermined number of half cycles, receiving means, means for transmitting said successive trains of half cycles to said receiving means, means for counting the number of half cycles received in each of said trains, means responsive to said means for counting the number of half cycles received for operating one of a plurality of gas-discharge devices indicative of the number of half cycles in the first of said trains, and means for maintaining said operated gas-discharge device in its operated condition during the transmission and reception of succeeding trains.

3. In a signaling system, means for producing a current wave substantially sinusoidal in character, means for counting successive trains of half cycles of said wave, receiving means, means for transmitting a first train of a predetermined number of half cycles to said receiving means, means for counting the number of half cycles received in said first train, means responsive to said means for counting the number of half cycles received in said first train for actuating one of a plurality of gas-discharge devices indicative of the number of half cycles in said first train, means for transmitting to said receiving means a second train of a number of half cycles differing from the number in said first train, means for counting the number of half cycles in said second train, means for maintaining operated said actuated gas-discharge device during the reception of the half cycles in said second train, and means responsive to said means for counting the number of half cycles in said second train for extinguishing said actuated gas-discharge device.

4. In a signaling system, means for producing a current wave substantially sinusoidal in form, means for counting successive trains of half cycles of said wave, receiving means, means for transmitting a first train of a predetermined number of half cycles to said receiving means, means for counting the number of half cycles received in said first train, means responsive to said means for counting the number of cycles received in said first train for actuating one of a plurality of gas-discharge devices indicative of the number of half cycles in said first train, means for transmitting to said receiving means a second train of a number of half cycles differing from the number in said first train, means for counting the number of half cycles in said second train, means for maintaining operated said actuated gas-discharge device during the reception of the half cycles in said second train, means responsive to said means for counting the number of half cycles in said second train for extinguishing said actuated gas-discharge device and for actuating another of said gas-discharge devices indicative of the number of half cycles in said second train.

HENRY M. BASCOM.
ROBERT F. MASSONNEAU.
BERNARD OSTENDORF, JR.
WILTON T. REA.

REFERENCES CITED

The following references are of record in the file of this patent:

UNITED STATES PATENTS

| Number | Name | Date |
|---|---|---|
| 1,765,538 | Nelson | June 24, 1930 |
| 2,226,692 | Brunner | Dec. 31, 1940 |
| 2,373,134 | Massonneau | Apr. 10, 1945 |
| 2,379,093 | Massonneau | June 26, 1945 |